US012367566B2

(12) United States Patent
Qiu et al.

(10) Patent No.: US 12,367,566 B2
(45) Date of Patent: Jul. 22, 2025

(54) IMAGE ANOMALY DETECTION BY ENHANCING PATCHED FEATURES

(71) Applicant: International Business Machines Corporation, Armonk, NY (US)

(72) Inventors: Haoxiang Qiu, Tokyo (JP); Tadanobu Inoue, Yokohama (JP); Takayuki Katsuki, Tokyo (JP); Ryuki Tachibana, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 444 days.

(21) Appl. No.: 18/045,598

(22) Filed: Oct. 11, 2022

(65) Prior Publication Data

US 2024/0119576 A1   Apr. 11, 2024

(51) Int. Cl.
*G06T 7/00* (2017.01)
*G06T 7/11* (2017.01)

(52) U.S. Cl.
CPC .............. *G06T 7/0002* (2013.01); *G06T 7/11* (2017.01); *G06T 2207/20084* (2013.01); *G06T 2207/20132* (2013.01); *G06T 2207/30168* (2013.01)

(58) Field of Classification Search
CPC ................. G06T 7/0002; G06T 7/11; G06T 2207/20084; G06T 2207/20132; G06T 2207/30168
USPC ......................................................... 382/103
See application file for complete search history.

(56) References Cited

U.S. PATENT DOCUMENTS 10,964,011 B2   3/2021   Cosatto et al.

FOREIGN PATENT DOCUMENTS

IN   202141019200 A   5/2022
WO   2021191908 A1   9/2021

OTHER PUBLICATIONS

Zhang, Shan, et al. "Time-rEversed diffusioN tEnsor Transformer: A new TENET of Few-Shot Object Detection." arXiv e-prints (2022): arXiv-2210. (Year: 2022).*
Wei, Xian, et al. "Synthesizing Tensor Transformations for Visual Self-attention." arXiv e-prints (2022): arXiv-2201. (Year: 2022).*
Wu, Jiasong, et al. "Multilinear principal component analysis network for tensor object classification." IEEE Access 5 (2017): 3322-3331. (Year: 2017).*

(Continued)

*Primary Examiner* — Jonathan S Lee
(74) *Attorney, Agent, or Firm* — Amin, Turocy & Watson, LLP

(57) ABSTRACT

One or more systems, devices, computer program products, and/or computer-implemented methods provided herein relate to accurate anomaly detection in images using patched features. According to an embodiment, an extraction component can extract multiple layers of features from one or more patches of an image using a pretrained convolutional neural network (CNN). A feature mapping component can concatenate the features from the multiple layers to generate a tensor feature map comprising a one-dimensional feature vector for respective patches. A cropping component can perform center cropping on the tensor feature map. A calculation component can calculate a distance to a feature distribution mean for respective patches.

20 Claims, 14 Drawing Sheets

(56) References Cited

OTHER PUBLICATIONS

Qiao, Xingshuai, et al. "Radar point clouds processing for human activity classification using convolutional multilinear subspace learning." IEEE Transactions on Geoscience and Remote Sensing 60 (2022): 1-17. (Year: 2022).*
Hendrycks et al., "A Baseline for Detecting Misclassified and Out-of-Distribution Examples in Neural Networks" Oct. 3, 2018.
Golan et al., "Deep Anomaly Detection Using Geometric Transformations" Nov. 9, 2018.
Rippel et al. "Modeling the Distribution of Normal Data in Pre-Trained Deep Features for Anomaly Detection" Oct. 23, 2020.
Defard et al. "PaDiM: A Patch Distribution Modeling Framework for Anomaly Detection and Localization" Nov. 17, 2020.
"Anomaly Detection on MVTec AD" web accessed on Jul. 19, 2022: paperswithcode.com.
Roth et al., "Towards Total Recall in Industrial Anomaly Detection" Jun. 15, 2021.
Liznerski et al. Explainable Deep One-Class Classification. Mar. 18, 2021.
Garland et al., "Feature anomaly detection system (FADS) for intelligent manufacturing" Sandia National Laboratories. 19 pages.
"Convolution Neural Network (CNN)" Developers Breach. Web accessed Aug. 17, 2022. https://developersbreach.com/convolution-neural-network-deep-learning/.
"Reflectionpad2d" PyTorch: Web accessed on Aug. 17, 2022. https://pytorch.org/docs/stable/generated/torch.nn.ReflectionPad2d.html#torch.nn.ReflectionPad2d.

\* cited by examiner

IMAGE ANOMALY DETECTION BY ENHANCING PATCHED FEATURES

BACKGROUND

The subject disclosure relates to computing devices, and more specifically, to techniques of facilitating accurate anomaly detection in images using patches.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products are described in accordance with the present invention.

According to an embodiment, a system can comprise a memory that stores computer executable components and a processor that executes the computer executable components stored in the memory. The computer executable components can comprise: an extraction component that extracts multiple layers of features from a patch of an image using a pretrained convolutional neural network; a feature mapping component that concatenates the features from the multiple layers to generate a tensor feature map comprising a one-dimensional feature vector; a cropping component that performs center cropping on the tensor feature map; and a calculation component that calculates a distance to a feature distribution mean for respective patches.

According to another embodiment, a computer-implemented method can comprise extracting multiple layers of features from a patch of an image using a pretrained convolutional neural network; concatenating the features from the multiple layers to generate a tensor feature map comprising a one-dimensional feature vector; performing center cropping on the tensor feature map; calculating a distance to a feature distribution mean for respective patches; and calculating an image anomaly score based on the distance.

According to still another embodiment, a computer program product for facilitating anomaly detection in images can comprise a computer readable storage medium having program instructions embodied therewith. The program instructions can be executable by a processor to extract multiple layers of features from a patch of an image using a pretrained convolutional neural network; concatenate the features from the multiple layers to generate a tensor feature map comprising a one-dimensional feature vector; perform center cropping on the tensor feature map; calculate a distance to a feature distribution mean for respective patches; and calculate an image anomaly score based on the distance.

DETAILED DESCRIPTION

Figure 1:
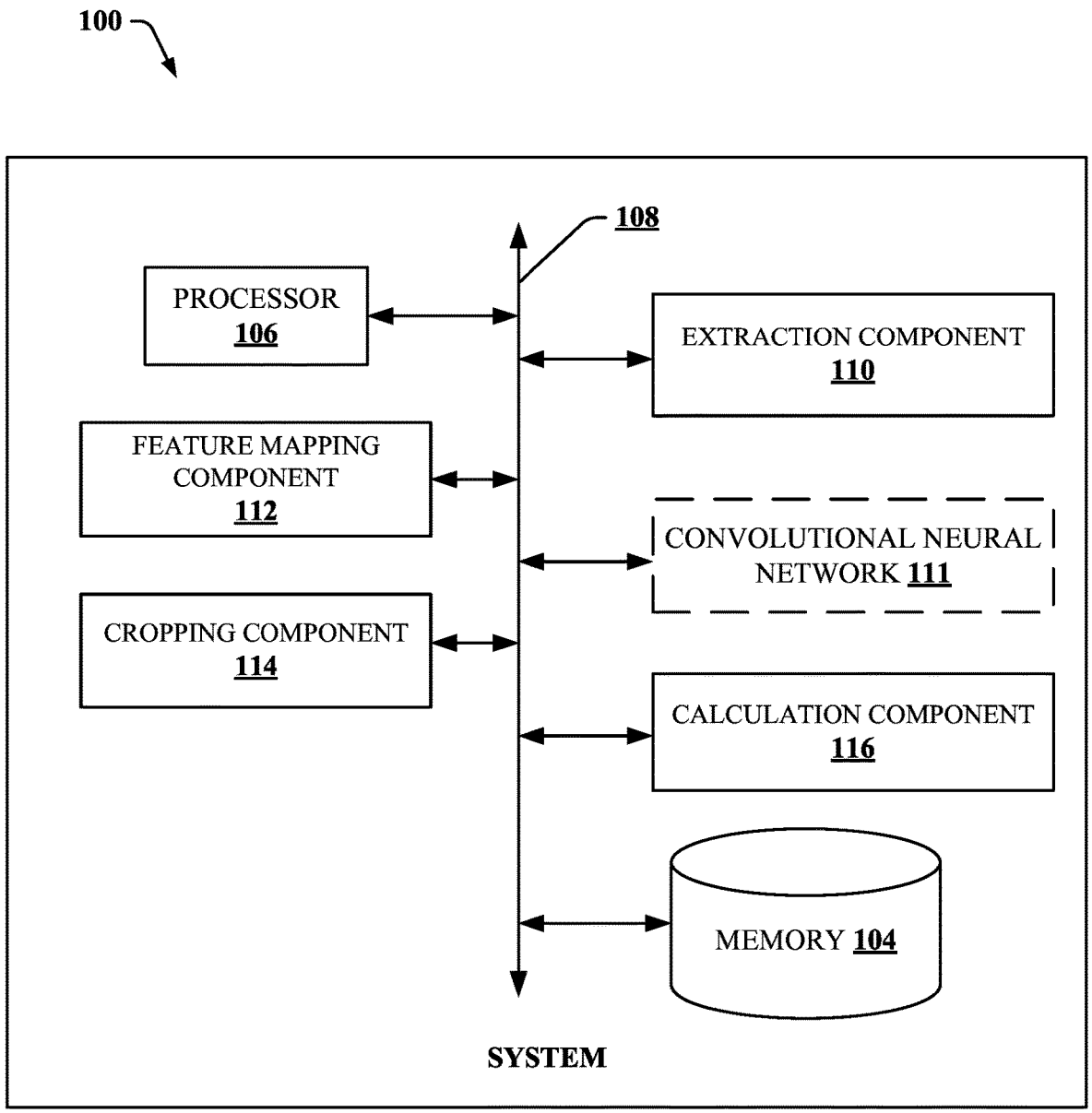
FIG. 1 illustrates a block diagram of an example, non-limiting system that can facilitate anomaly detection in images, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however in various cases, that the one or more embodiments can be practiced without these specific details.

Anomaly detection allows for the identification of unusual samples in a dataset and can be used to identify anomalies in images. Anomaly detection algorithms used to evaluate images have a wide range of applications. For example, anomaly detection in images can be used for quality inspection of products and infrastructure, equipment maintenance, network intrusion detection, and fraud detection. Ignorance and/or inaction towards anomalies that can be identified from images can result in failures or malfunctions in a system. Systems that allow for detection of anomalies in images can alert a proper entity to the anomaly. Anomaly detection systems can be used in contexts where it is impossible or impracticable for a human or even a group of humans to manually identify abnormalities in images. For example, in various contexts there may be a very large volume of images that need to be evaluated for anomalies.

In another example, anomalies could be very rare in a given context and human anomaly identification may be compromised due to boredom or complacency with the task.

Conventional anomaly detection systems sometimes generate inaccurate results. In a typical anomaly detection problem, there exists a training dataset consisting only of "normal" data and anomalous samples are not known a priori. The aim of anomaly detection models is to distinguish between anomalous samples and normal samples. While normal samples likely share a defined set of features, anomalies can often take a large number of forms. It is therefore difficult to train an anomaly detection model that can accurately identify an anomaly considering the many different forms it may take and can identify when a feature does not constitute an anomaly. For example, a small stain in the background of an image can generate a false indication of an anomaly in the subject of an image, resulting in a false positive. In another example, conventional anomaly detection can fail to recognize an abnormality in an image resulting in a false negative. False positives and false negatives reduce the overall reliability of an anomaly detection system and can lead to failures or malfunctions in various contexts.

One approach to anomaly detection in images utilizes patch distribution modeling (PaDiM). PaDiM generates an anomaly score for a patch of an image based on a Mahalanobis distance between a patch embedding from a target image and a distribution learned from a set of normal images. PaDiM uses a pretrained convolutional neural network to extract relevant features of an image to be evaluated for anomalies and creates several layers of intermediate features for the image. The intermediate features from the several layers are unfolded to create patch embeddings. The unfolded intermediate features from the several layers are concatenated to create a feature embedding vector. A Mahalanobis distance is calculated for each patch's feature embedding vector. A Mahalanobis distance measures the distance between a point and a distribution. The Mahalanobis distance increases with the distance a point is from the mean of a distribution. In PaDiM, the Mahalanobis distance measures the distance between a point defined by the feature embedding vector of a patch and a distribution defined by a set of training embedding vectors. The convolutional neural network generates training embedding vectors from a set of training images for a spatially corresponding patch. PaDiM learns the Gaussian parameters from the set of training embedding vectors. A Mahalanobis distance can then be calculated between the point defined from the feature embeddings vector and the distribution learned from training images. An image level anomaly score can be calculated by selecting a maximum Mahalanobis distance associated with the image.

PaDiM may outperform some other methods of automated anomaly detection. PaDiM, however, still sometimes produces inaccuracies as to whether an image contains an anomaly. The present invention improves upon PaDiM and other methods utilizing a convolutional neural network and patched features for anomaly detection by enhancing utilization of patched features. For example, various embodiments of the present disclosure can be implemented to produce an improved area under the ROC curve metric compared to other implementations of anomaly detection in many contexts, including traditional PaDiM.

To address the challenges of image anomaly detection systems in generating accurate identification of abnormalities or irregularities in images as described herein, one or more exemplary embodiments can produce identification of anomalies in images with a higher rate of accuracy than that of conventional methods. An image can be obtained. An extraction component can utilize a pretrained convolutional neural network to extract relevant features from the image. In doing so, the convolutional neural network creates several layers of intermediate features for the image. A resizing component can resize the intermediate features so that all of the intermediate features from the several layers are the same size. A feature mapping component can concatenate the features from the multiple layers to generate a tensor feature map comprising a one-dimensional feature vector corresponding to a patch in the image. A cropping component can perform center cropping on the tensor feature map. A calculation component can calculate a distance to a feature distribution mean for respective patches. The mean of the patch's distribution is determined by an estimation of the parameters of a multivariate Gaussian distribution on the one-dimensional feature vector from a set of training images. The calculated distance to a feature distribution mean can be a Mahalanobis distance between the one-dimensional feature vector of the patch and the mean of the multivariate Gaussian distribution for the patch. A scoring component can calculate an image anomaly score based on the distance. The image anomaly score can be based on the average of a maximum percentage of various Mahalanobis distances associated with different patches of an image.

The invention disclosed herein identifies multiple improvements to known anomaly detection methods that utilize patch distributions to identify anomalies in images. Implementation of any one or any combination of the improvements described herein result in increased accuracy and reliability in an anomaly detection system. For example, performing center cropping of a feature tensor map in conjunction with another anomaly detection method, such as PaDiM, improves performance compared to traditional PaDiM as discussed further in reference to FIG. 10. In another example, resizing the intermediate features to the same size in conjunction with another anomaly detection method such as PaDiM, improves performance compared to traditional PaDiM, as discussed further in reference to FIG. 11. In another example, averaging a maximum percentage of Mahalanobis distances associated with different patches in conjunction with another anomaly detection method, such as PaDiM, improves performance compared to traditional PaDiM as discussed further in reference to FIG. 12. In another example, implementing an embodiment of each of performing center cropping of a feature tensor map, resizing the intermediate features to the same size, and averaging a maximum percentage of Mahalanobis distances associated with different patches in conjunction with another anomaly detection method, such as PaDiM, improves performance compared to traditional PaDiM, as discussed further in reference to FIG. 13.

One or more embodiments of the subject disclosure is directed to computer processing systems, computer-implemented methods, apparatus and/or computer program products that facilitate efficiently, effectively, and automatically (e.g., without direct human involvement) generating accurate detection of anomalies in images by enhancing the utilization of patched features. The computer processing systems, computer-implemented methods, apparatus and/or computer program products can employ hardware and/or software to solve problems that are highly technical in nature (e.g., utilizing a convolutional neural network to extract layers of features from an image, concatenating patches to produce a tensor feature map, and calculating the Mahalanobis distance between a one-dimensional feature vector and a mean of the multivariate Gaussian distribution for the patch) that are not abstract and that cannot be performed as a set of mental acts by a human.

By way of overview, aspects of systems apparatuses or processes in accordance with the present invention can be implemented as machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

One or more embodiments are now described with reference to the drawings, where like referenced numerals are used to refer to like elements throughout. As used herein, the term "entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
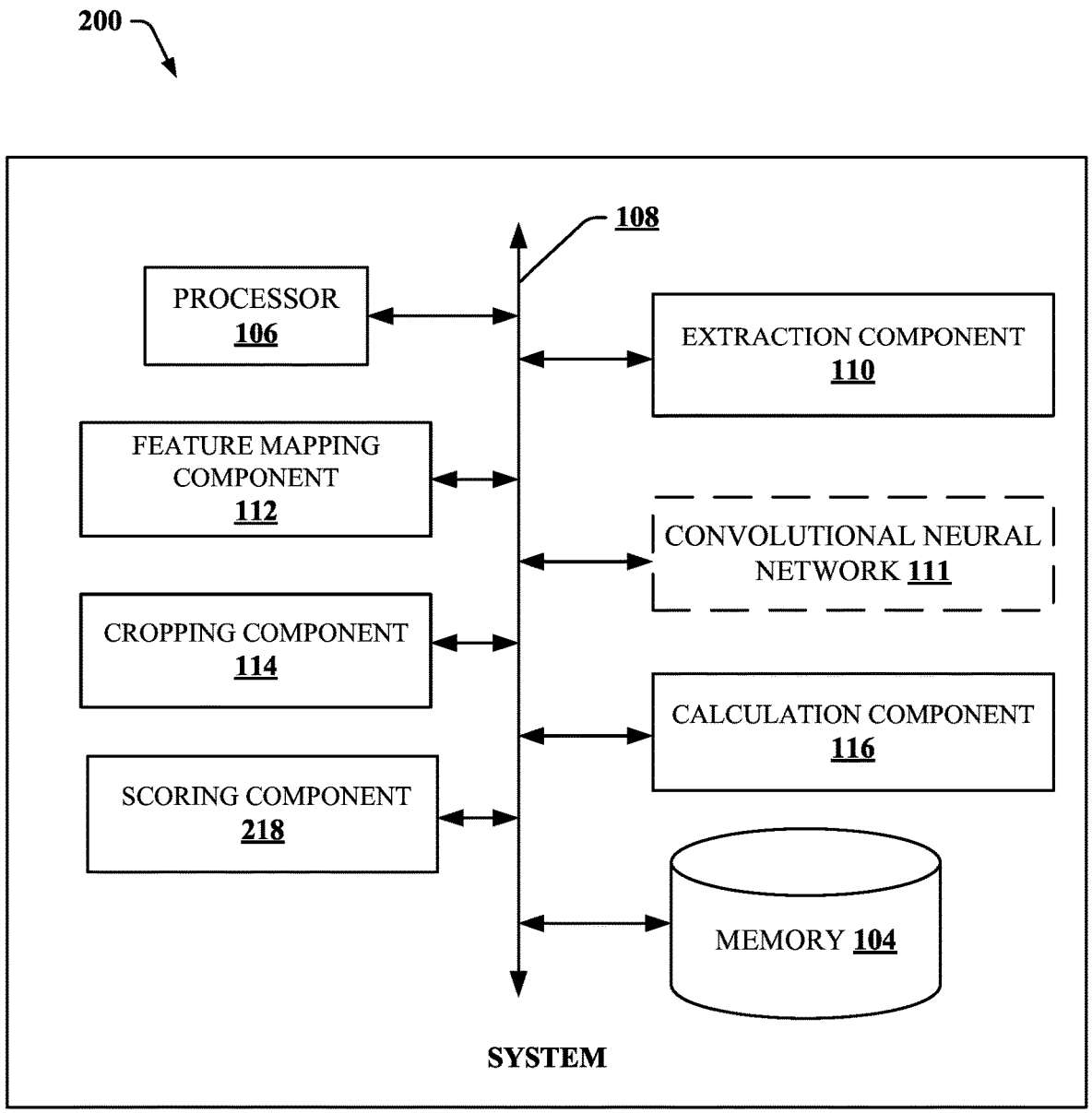
FIG. 2 illustrates another block diagram of an example, non-limiting system that can facilitate anomaly detection in images, in accordance with one or more embodiments described herein.
Figure 3:
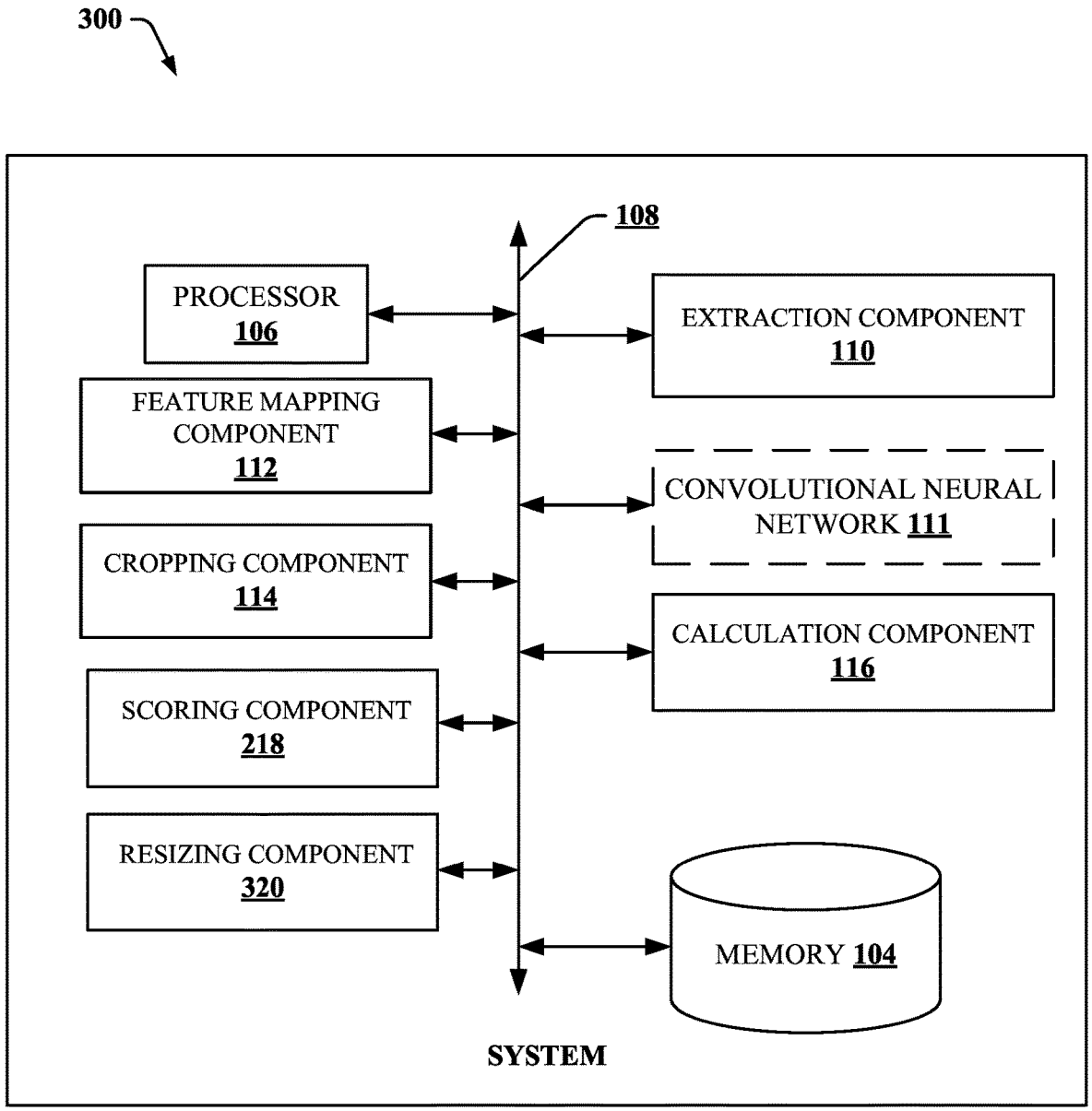
FIG. 3 illustrates another block diagram of an example, non-limiting system that can facilitate anomaly detection in images, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100, 200, and/or 300 as illustrated at FIGS. 1, 2 and 3, and/or systems thereof, can further comprise, be associated with and/or be coupled to one or more computer and/or computing-based elements described herein with reference to an operating environment, such as the operating environment 1400 illustrated at FIG. 14. In one or more described embodiments, computer and/or computing-based elements can be used in connection with implementing one or more of the systems, devices, components and/or computer-implemented operations shown and/or described in connection with FIGS. 1, 2, and/or 3 and/or with other figures described herein.

FIG. 1 illustrates a block diagram of an example, non-limiting system that can facilitate anomaly detection in images, in accordance with one or more embodiments described herein. As illustrated in FIG. 1, the system 100 can comprise one or more components such as a memory 104, a processor 106, a bus 108, an extraction component 110, a convolutional neural network 111, a feature mapping component 112, a cropping component 114, and a calculation component 116. Generally, system 100 can facilitate highly accurate detection of anomalies in images by enhancing utilization of patched features of the image.

One or more exemplary embodiments of the present invention can calculate a distance to a feature distribution mean for respective extracted patches. The extraction component 110 can extract multiple layers of features from a patch of an image using a pretrained convolutional neural network 111. A patch of an image can comprise one or more pixels comprising a portion of the image. The features can be specific parts of an image that represent sections of an object that are relevant for anomaly detection. The extraction component 110 can extract multiple features from multiple patches of the same image to facilitate the generation of an anomaly map. The feature mapping component 112 can concatenate the features from the multiple layers to generate a tensor feature map comprising a one-dimensional feature vector. The one-dimensional feature vector can be an embedding vector that contains information from multiple layers. In an embodiment, the feature mapping component 112 concatenates the features from the multiple layers after they have been resized. A cropping component 114 can perform center cropping on the tensor feature map. For example, center cropping can be performed by removing the padding added to an image by a convolutional network, as described in reference to FIG. 5.

A calculation component 116 can calculate a distance to a feature distribution mean for respective patches. For example, the calculation component 116 can calculate a distance to a feature distribution mean for respective features by estimating parameters of a multivariate Gaussian distribution on one-dimensional feature vectors of the patch and calculating a distance between the one-dimensional feature vectors of the patch and a mean of the multivariate Gaussian distribution for the patch. In an embodiment, the calculated distance can be a Mahalanobis distance. The calculation component can learn the feature distribution of a patch from the tensor feature map. The distance can be calculated based on the embeddings of the one-dimensional feature vectors of the patch.

The various devices (e.g., system 100) and components (memory 104, processor 106, an extraction component 110, a convolutional neural network 111, a feature mapping component 112, a cropping component 114, and a calculation component 116 and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

FIG. 2 illustrates a block diagram of an example, non-limiting system 200 that facilitates detection of anomalies in images by enhancing patched features in accordance with one or more embodiments described herein. Repetitive description of like elements and/or processes employed in respective embodiments is omitted for sake of brevity. As indicated previously, description relative to an embodiment of FIGS. 1 and/or 3 can be applicable to an embodiment of FIG. 2. Likewise, description relative to an embodiment of FIG. 2 can be applicable to an embodiment of FIGS. 1 and/or 3.

One or more exemplary embodiments of the present invention can calculate a distance to a feature distribution mean for respective patches to facilitate detection of an anomaly in an image. The system 200 comprises a scoring component 218. The scoring component 218 can calculate an image anomaly score based on the distance calculated by the calculation component. The scoring component 218 can identify the maximum distance calculated for a given patch. In an embodiment, the distance can be a Mahalanobis distance. The anomaly score can be an image level anomaly score that determined by averaging maximum distances associated with different patches.

FIG. 3 illustrates a block diagram of an example, non-limiting system 300 that facilitates detection of anomalies in images by enhancing patched features in accordance with one or more embodiments described herein. Repetitive description of like elements and/or processes employed in respective embodiments is omitted for sake of brevity. As indicated previously, description relative to an embodiment of FIGS. 1 and/or 2 can be applicable to an embodiment of FIG. 3. Likewise, description relative to an embodiment of FIG. 3 can be applicable to an embodiment of FIGS. 1 and/or 2.

One or more exemplary embodiments of the present invention can calculate a distance to a feature distribution mean for respective patches to facilitate detection of an anomaly in an image. The system 300 comprises a resizing component 320. The resizing component 320 can resize the features of the multiple layers to a same size. This resizing can be done by, for example, interpolation. In an embodiment, the resizing component 320 resizes the features of the multiple layers before the feature mapping component 112 concatenates the features of the multiple layers.

Figure 4:
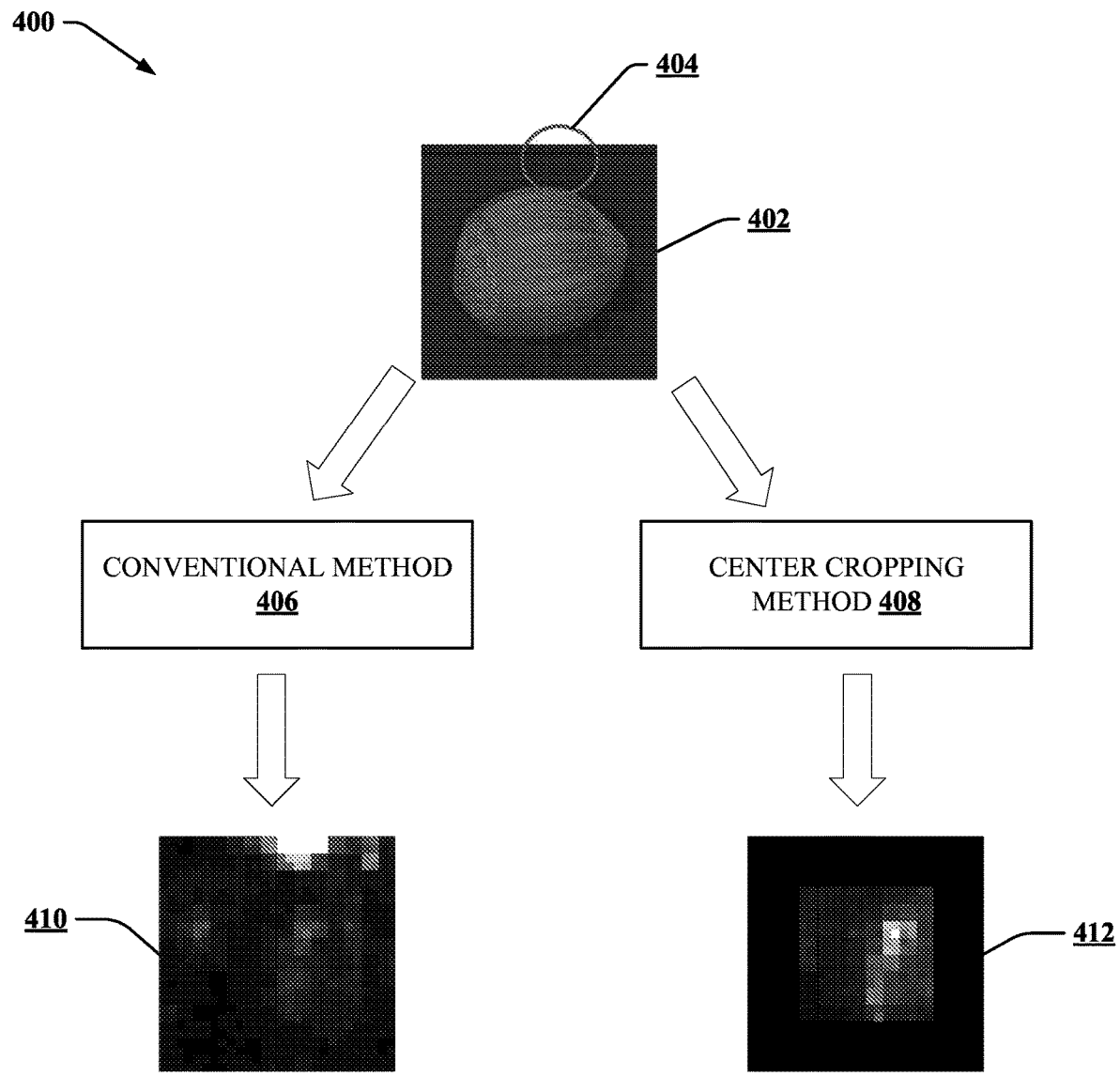
FIG. 4 illustrates a non-limiting example of an effect of feature map center cropping.

FIG. 4 illustrates a non-limiting example of an effect of feature map center cropping for an image 402. The image 402 contains the image of a hazelnut. The image 402 contains a stain 404 in the background area of the image. In this example, the background area where the stain 404 is located is an area with a low signal to noise ratio. This type of stain may be inevitable on some images due to limitations on the photographing environment. When the image 404 is evaluated using a conventional anomaly detection method 406, the resulting anomaly map 410 indicates a high anomaly score towards the top of the anomaly map corresponding to where the stain 404 is located on the image 402. This is a false positive in the anomaly map where only the image of the hazelnut should be evaluated for anomalies. As previously discussed, false positives and false negatives decrease the overall reliability of an anomaly detection method or system.

The image 402 can undergo the center-cropping method 408 as part of the anomaly detection embodiment as described herein. Compared to the anomaly map 410, the anomaly map 412 resulting from the center-cropping method does not contain the false positive from the stain 404. This increases the overall reliability of the anomaly detection system as described herein.

Figure 5:
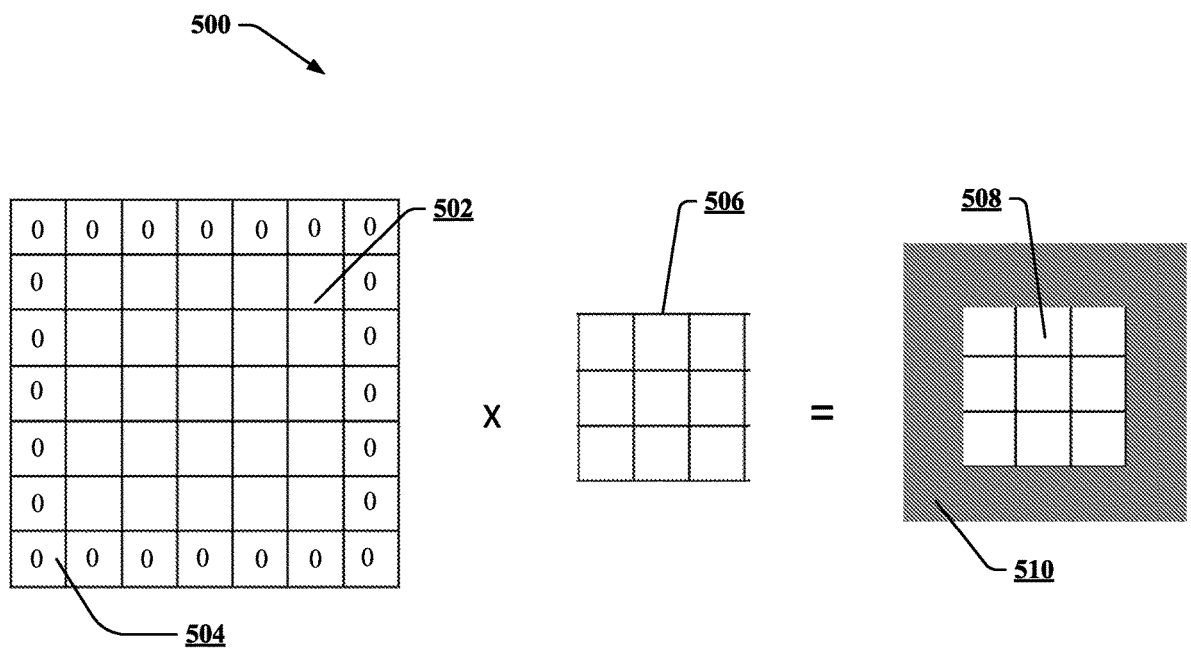
FIG. 5 illustrates a non-limiting example of padding.

FIG. 5 illustrates an example, non-limiting center cropping method that can be utilized by cropping component 114. A convolutional neural network 111 may use padding 504 (indicated by 0s) on an input image 502 so that the dimension of the output feature map 508 is the same as the dimension of the input image 502 after being filtered through the kernel 506 as part of a feature extraction. The center cropping component 114 can remove the padding 510 of the feature map.

Figure 6:
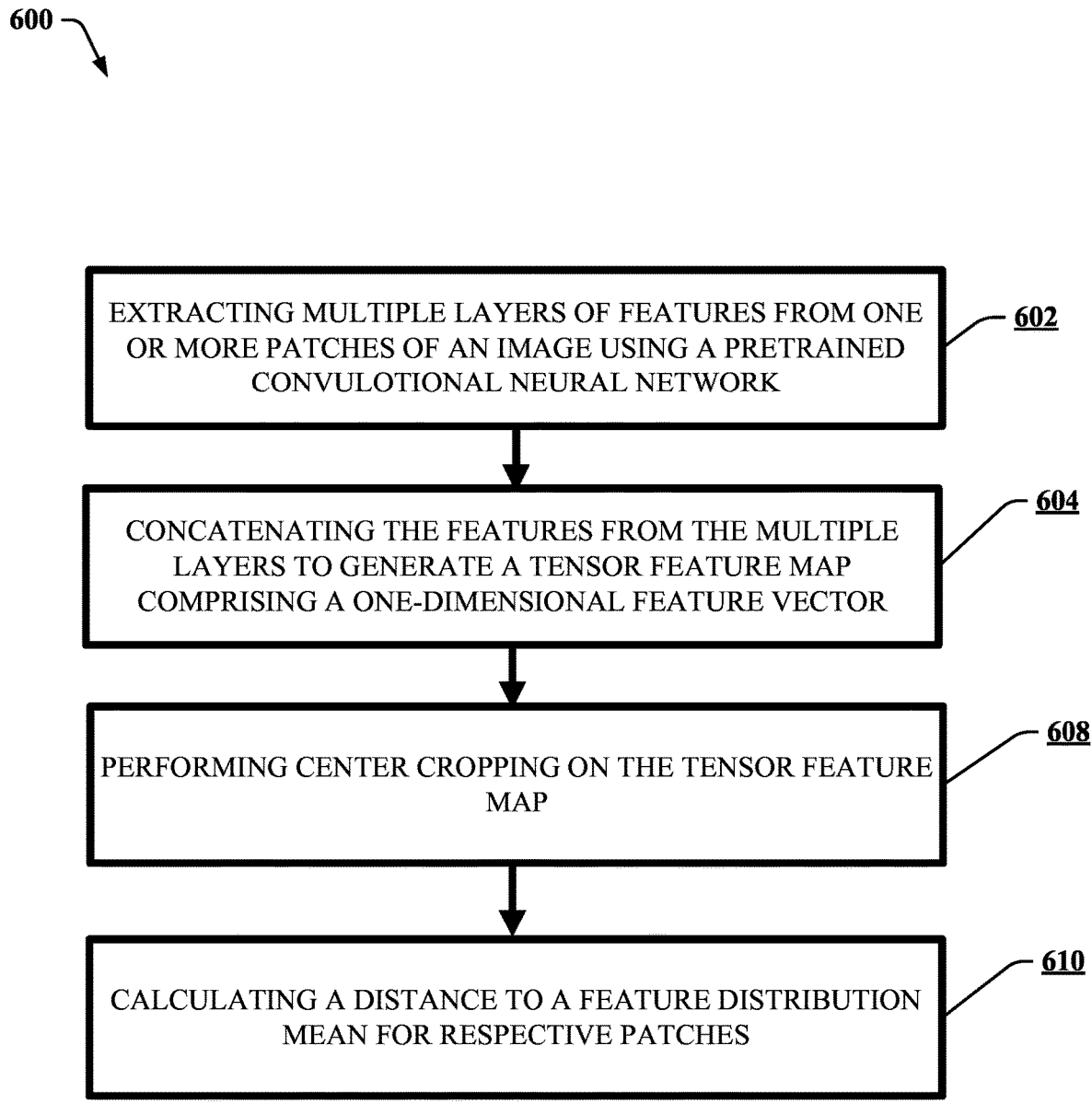
FIG. 6. illustrates a flow diagram of an example, non-limiting computer-implemented method in accordance with one or more embodiments described herein.

FIG. 6 illustrates a flow diagram of an example, non-limiting method 600 that can facilitate detection of anomalies in images using enhanced patched features, in accordance with one or more embodiments described herein, such as the non-limiting system 100 of FIG. 1. While the non-limiting method 600 is described relative to the non-limiting system 100 of FIG. 1, the non-limiting method 600 can be applicable also to other systems described herein, such as the non-limiting system 200 of FIG. 2 and/or the non-limiting system 300 of FIG. 3. Repetitive description of like elements and/or processes employed in respective embodiments is omitted for sake of brevity.

At 602, the non-limiting method 600 can comprise extracting, by a system (e.g., extraction component 110) operatively coupled to a processor, multiple layers of features from one or more patches of an image using a pretrained convolutional neural network (e.g., convolutional neural network 111). At 604, the non-limiting method 600 can comprise concatenating, by the system (e.g., feature mapping component 112), the features from the multiple layers to generate a tensor feature map comprising a one-dimensional feature vector. At 608, the non-limiting method 600 can comprise performing, by a system (e.g., cropping component 114), center cropping on the tensor feature map. At 610, the non-limiting method 600 can comprise calculating, by a system (e.g., calculation component 116), a distance to a feature distribution mean for respective patches.

Figure 7:
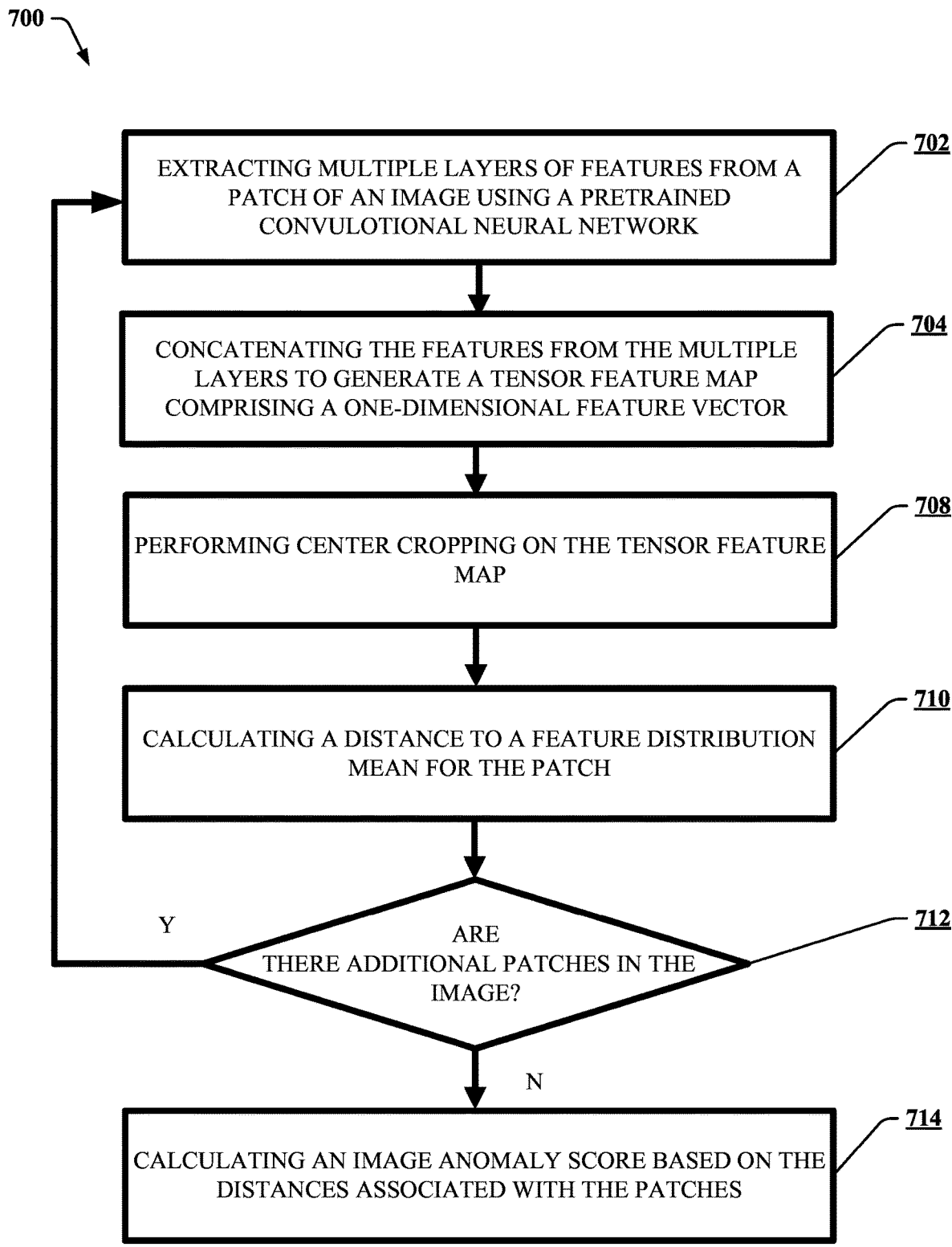
FIG. 7 illustrates a flow diagram of an example, non-limiting computer-implemented method in accordance with one or more embodiments described herein.

Next, FIG. 7 illustrates a flow diagram of an example, non-limiting method 700 that can facilitate detection of anomalies in images using enhanced patched features accordance with one or more embodiments described herein, such as the non-limiting system 200 of FIG. 2. While the non-limiting method 700 is described relative to the non-limiting system 200 of FIG. 2, the non-limiting method 700 can be applicable also to other systems described herein, such as the non-limiting system 100 of FIG. 1 and/or the non-limiting system 300 of FIG. 3. Repetitive description of like elements and/or processes employed in respective embodiments is omitted for sake of brevity.

At 702, the non-limiting method 700 can comprise extracting, by a system (e.g., extraction component 110) operatively coupled to a processor, multiple layers of features from a patch of an image using a pretrained convolutional neural network (e.g., convolutional neural network 111). At 704, the non-limiting method 700 can comprise concatenating, by the system (e.g., feature mapping component 112), the features from the multiple layers to generate a tensor feature map comprising a one-dimensional feature vector. At 708, the non-limiting method 700 can comprise performing, by a system (e.g., cropping component 114), center cropping on the tensor feature map. At 710, the non-limiting method 700 can comprise calculating, by a system (e.g., calculation component 116), a distance to a feature distribution mean for the patch. At 712, the non-limiting method 700 can determine whether there are more patches of the image to calculate a Mahalanobis distance for. If not, the non-limiting method 700 can proceed to 714. If so, the non-limiting method 700 can proceed to step 702. At 714, the non-limiting method 700 can comprise calculating, by a system (e.g., scoring component 218), an image anomaly score based on the distance associated with the patches.

Figure 8:
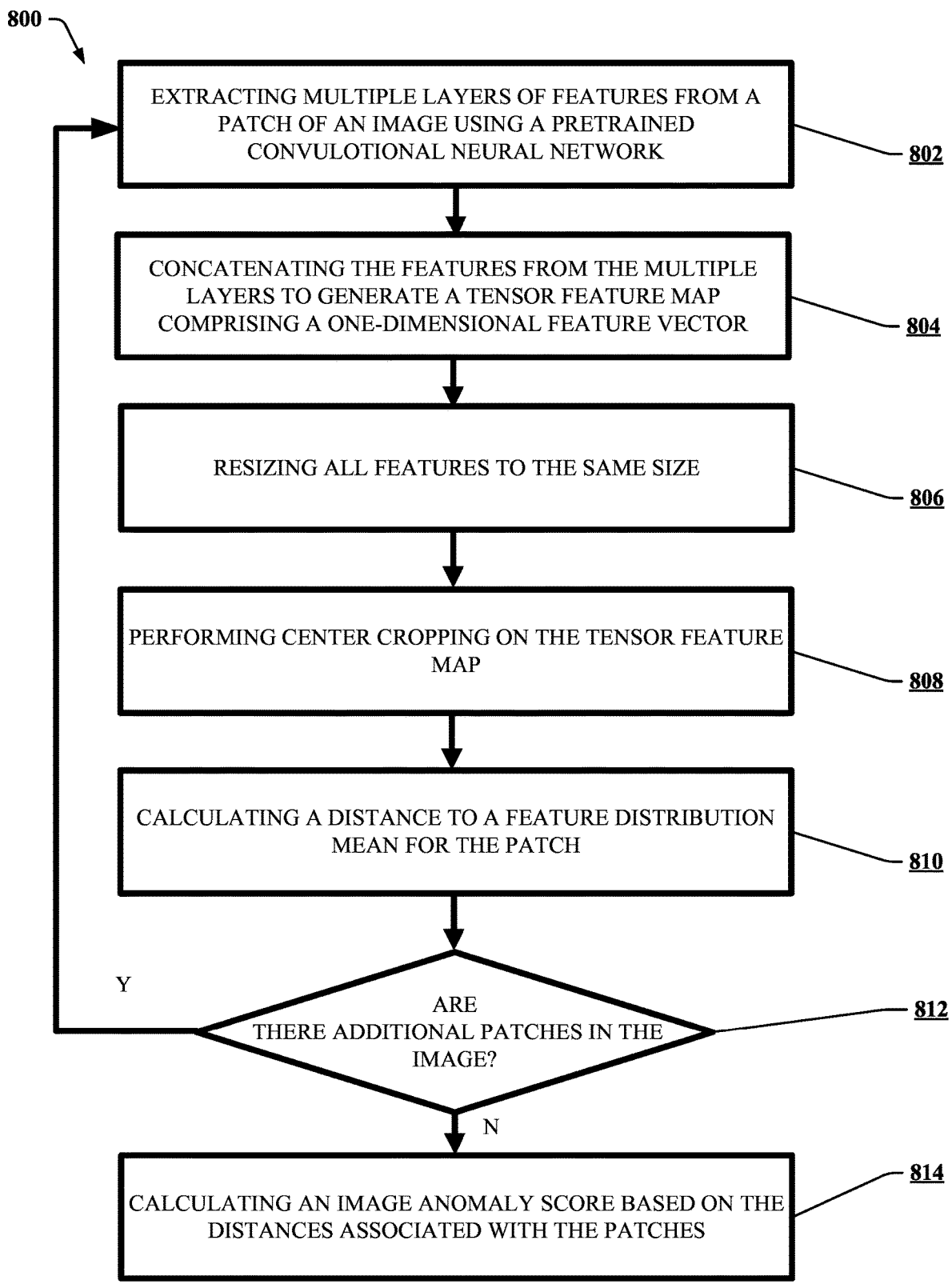
FIG. 8 illustrates a flow diagram of an example, non-limiting computer-implemented method in accordance with one or more embodiments described herein.

Next, FIG. 8 illustrates a flow diagram of an example, non-limiting method 800 that can facilitate detection of anomalies in images using enhanced patched features accordance with one or more embodiments described herein, such as the non-limiting system 300 of FIG. 3. While the non-limiting method 800 is described relative to the non-limiting system 300 of FIG. 3, the non-limiting method 800 can be applicable also to other systems described herein, such as the non-limiting system 100 of FIG. 1 and/or the non-limiting system 200 of FIG. 2. Repetitive description of like elements and/or processes employed in respective embodiments is omitted for sake of brevity.

At 802, the non-limiting method 800 can comprise extracting, by a system (e.g., extraction component 110) operatively coupled to a processor, multiple layers of features from a patch of an image using a pretrained convolutional neural network (e.g., convolutional neural network 111). At 804, the non-limiting method 800 can comprise concatenating, by the system (e.g., feature mapping component 112), the features from the multiple layers to generate a tensor feature map comprising a one-dimensional feature vector. At 806, the non-limiting method 800 can comprise resizing, by the system (e.g., resizing component 320), all features to the same size. At 808, the non-limiting method 800 can comprise performing, by a system (e.g., cropping component 114), center cropping on the tensor feature map. At 810, the non-limiting method 800 can comprise calculating, by a system (e.g., calculation component 116), a distance to a feature distribution mean for the patch. At 812, the non-limiting method 800 can determine whether there are more patches of the image to calculate a distance for. In an embodiment, the distance can be a Mahalanobis distance. If not, the non-limiting method 800 can proceed to 814. If so, the non-limiting method 800 can proceed to step 802. At 814, the non-limiting method 800 can comprise calculating, by a system (e.g., scoring component 218), an image anomaly score based on the distance associated with the patches.

Figure 9:
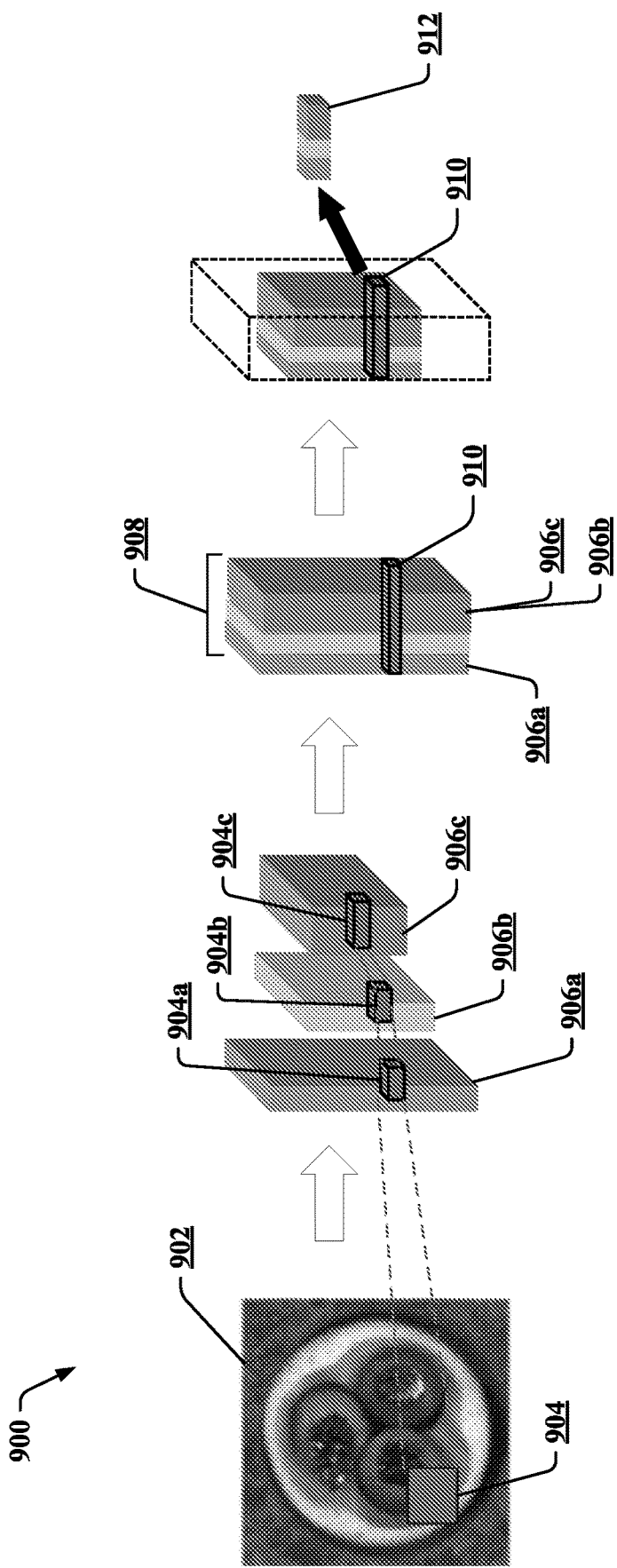
FIG. 9 illustrates a non-limiting example of feature extraction, concatenation of features, and center cropping.

FIG. 9 illustrates a non-limiting example of feature extraction, concatenation of features, and center cropping. Features can be extracted from a patch 904 of an image 902. Several layers (906a, 906b, and 906c) of intermediate convolutional neural network features will be created from the image, each containing a layer of patch 904 (904a, 904b, and 904c). Although three layers are pictured (906a, 906b, and 906c) any number of layers may be created. Layers 906a, 906b, and 906c can be resized so that features from different layers are the same size. The feature from different layers can be resized using interpolation. Layers 906a, 906b, and 906c can be concatenated so that layers of the patch 904a, 904b, and 904c are aligned. The concatenation of layers generates a tensor feature map 908 comprising a one-dimensional feature vector 910. Center cropping can be performed on the tensor feature map 908. Center cropping can be performed by removing the padding added to an image by a convolutional network, as described in reference to FIG. 5. The one-dimensional feature vector 910 has a patch feature distribution 912.

Figure 10:
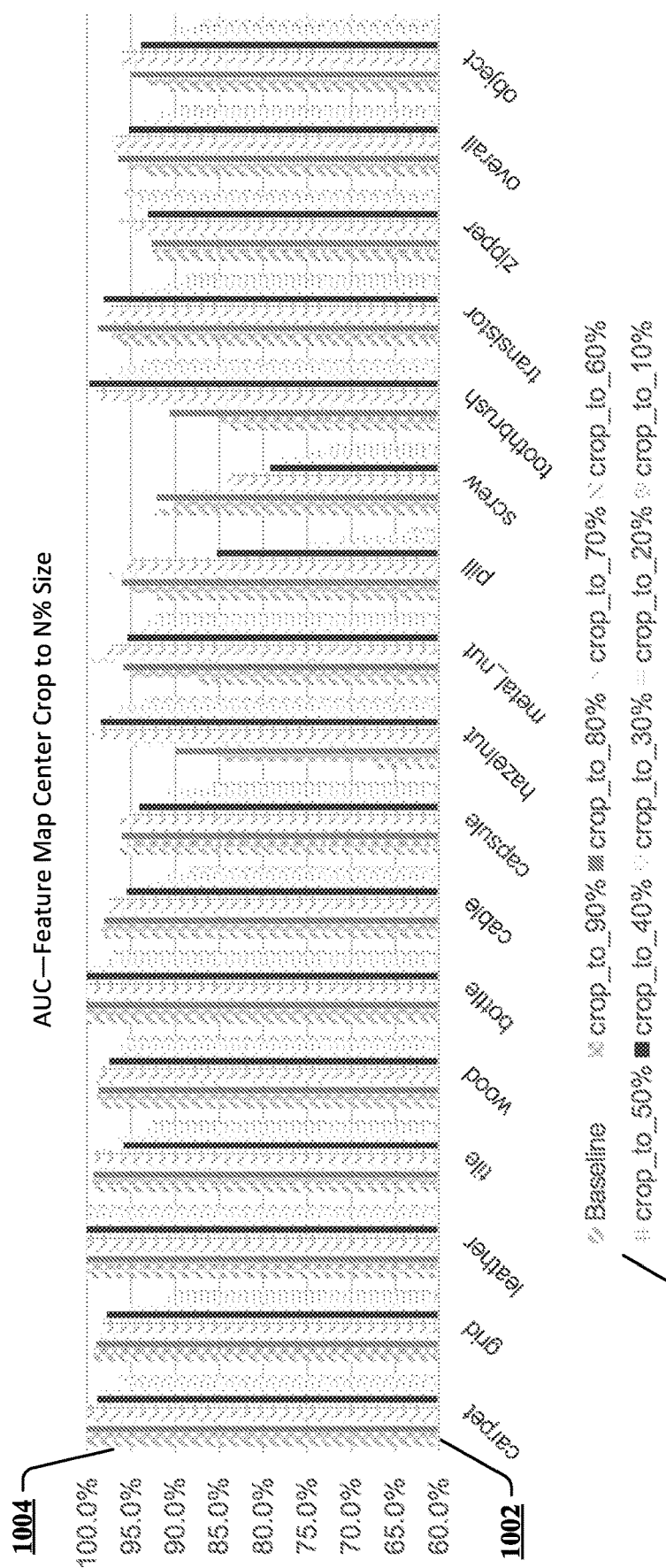
FIG. 10 illustrates a non-limiting example of a graph demonstrating the effect on accuracy of feature map center cropping to various sizes for images of different objects.

FIG. 10 illustrates a non-limiting example of a graph demonstrating the effect on accuracy of feature map center cropping to various sizes for images of different objects. The objects evaluated in images for anomalies are listed along the x-axis 1002. The area under the curve (AUC) for the various methods is along the y-axis 1004. The AUC is a metric for measuring the accuracy of anomaly detection methods. The graph legend 1006 shows that the bars in the bar graph represent center cropping to various extents in accordance with one or more embodiments described herein and a baseline method that does not use center cropping.

Figure 11:
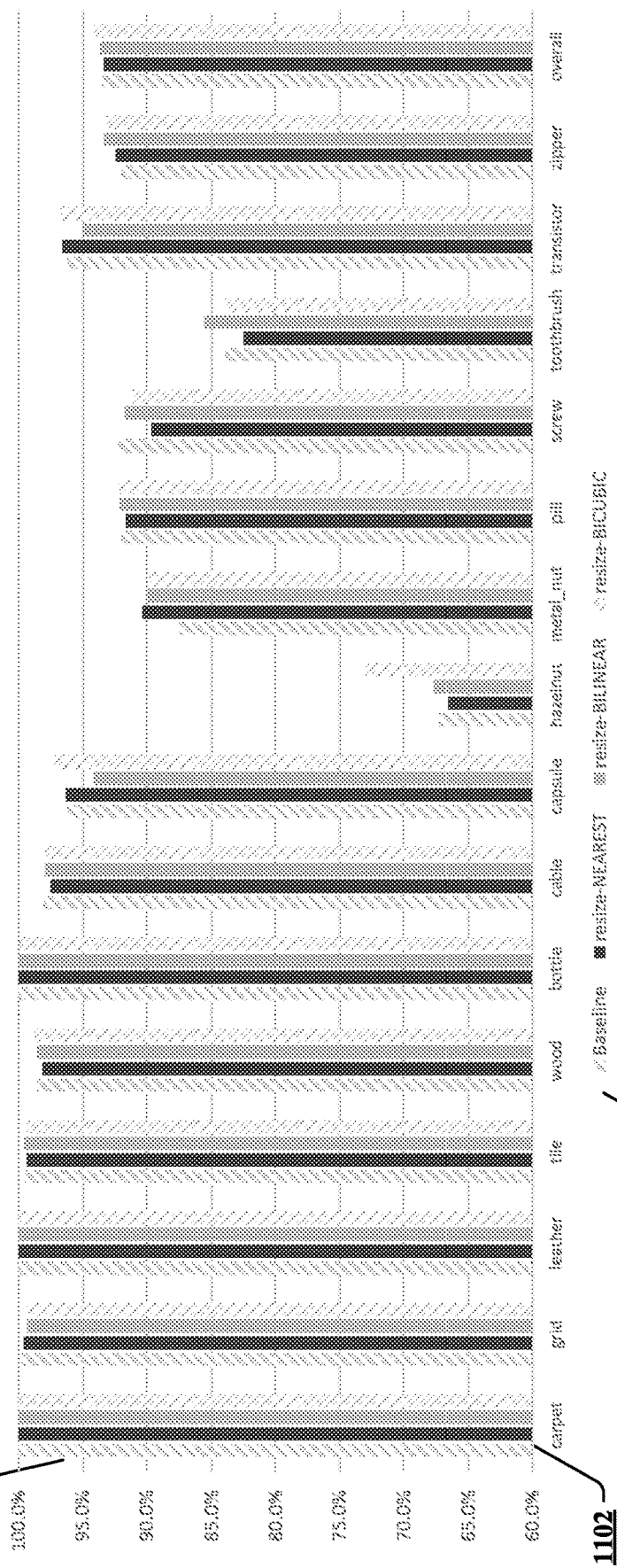
FIG. 11 illustrates a non-limiting example of a graph demonstrating the effect on accuracy of resizing features to the same size for images of different objects.

FIG. 11 illustrates a non-limiting example of a graph demonstrating the effect on accuracy of resizing features to the same size for images of different objects. The objects evaluated in images for anomalies are listed along the x-axis 1102. The area under the curve (AUC) for the various methods is along the y-axis 1104. The AUC is a metric for measuring the accuracy of anomaly detection methods. The graph legend 1106 shows that the bars in the bar graph various resizing methods in accordance with one or more embodiments described herein and a baseline method that does not use resizing. For example, the features can be resized using bilinear interpolation. In another example, the features can be resized using nearest-neighbor interpolation. In another example, the features can be resized using bicubic interpolation.

Figure 12:
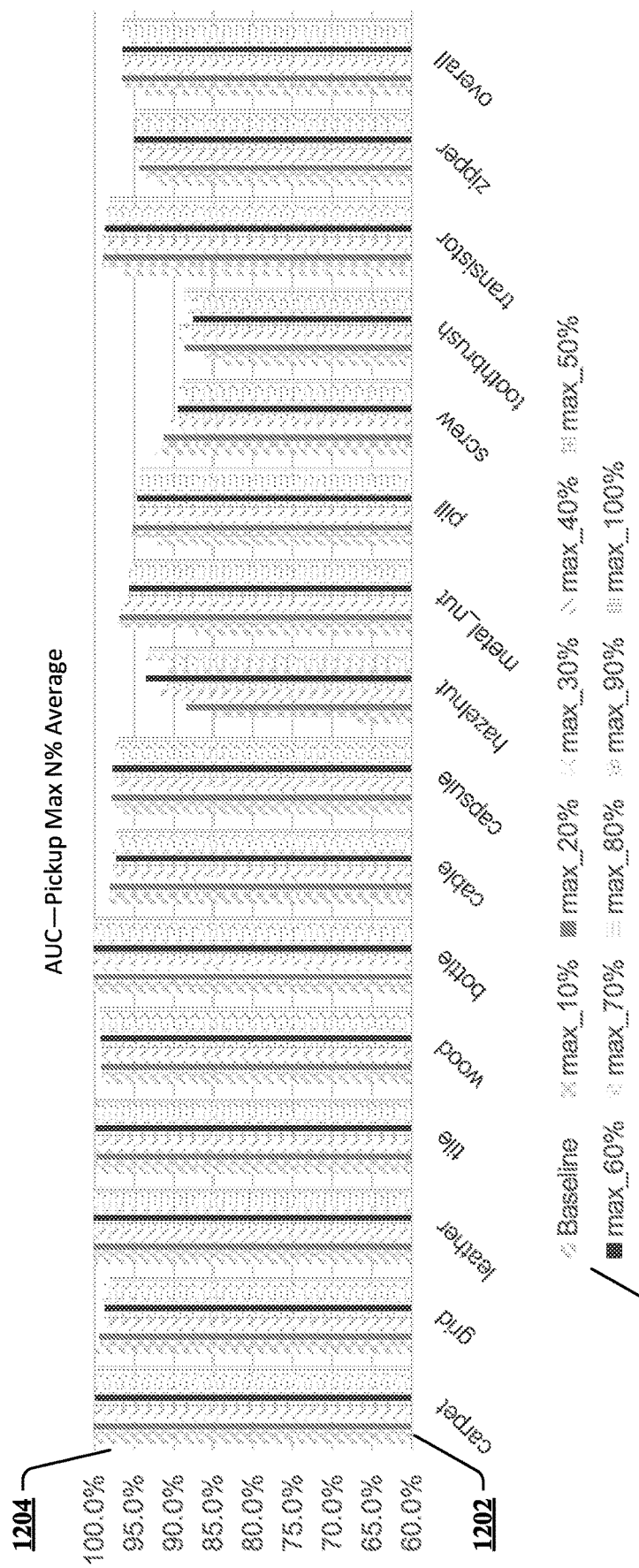
FIG. 12 illustrates a non-limiting example of a graph demonstrating the effect on accuracy of averaging a maximum percentage of Mahalanobis distances associated with different patches for images of different objects.

FIG. 12 illustrates a non-limiting example of a graph demonstrating the effect on accuracy of averaging a maximum percentage of Mahalanobis distances associated with different patches for images of different objects. The objects evaluated in images for anomalies are listed along the x-axis 1202. The area under the curve (AUC) for the various methods is along the y-axis 1204. The AUC is a metric for measuring the accuracy of anomaly detection methods. The graph legend 1206 shows that the bars in the bar graph various maximum percentages of Mahalanobis distances in accordance with one or more embodiments described herein and a baseline method that does not use averaging of a maximum percentage of Mahalanobis distances.

Figure 13:
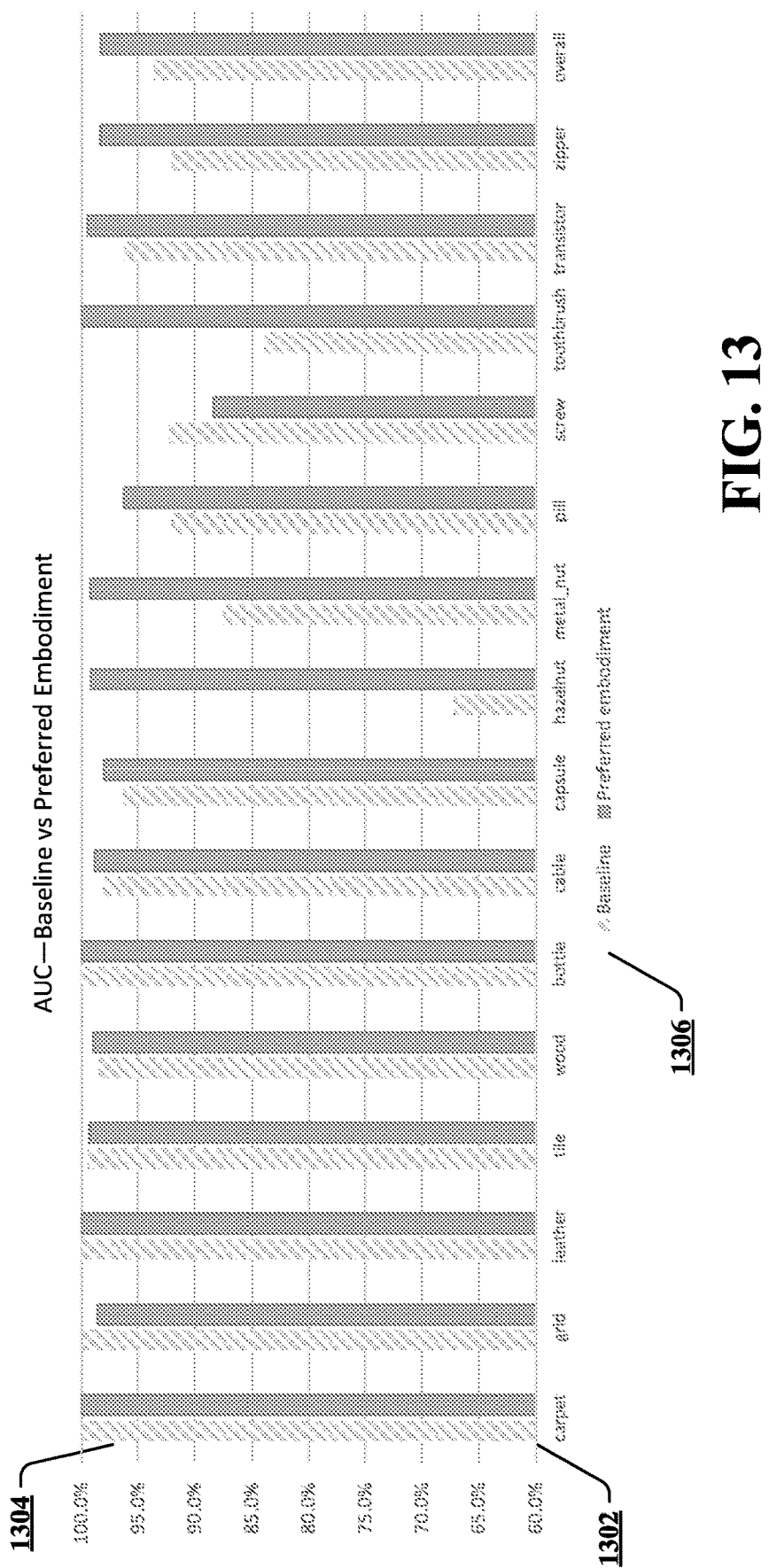
FIG. 13 illustrates a non-limiting example of a graph demonstrating the effect on accuracy of a preferred embodiment compared to a known method.

FIG. 13 illustrates a non-limiting example of a graph demonstrating the effect on accuracy of a preferred embodiment compared to a known method. For example, the preferred embodiment can be center cropping to 70% size, resizing using bilinear interpolation, and averaging a maximum percentage of 5% Mahalanobis distances. The objects evaluated in images for anomalies are listed along the x-axis 1302. The area under the curve (AUC) for the various methods is along the y-axis 1304. The AUC is a metric for measuring the accuracy of anomaly detection methods. The graph legend 1306 shows that one bar in the bar graph represents the preferred embodiment and one represents baseline method that does not use center cropping, resizing, or an averaging of a maximum percentage of Mahalanobis distances.

Figure 14:
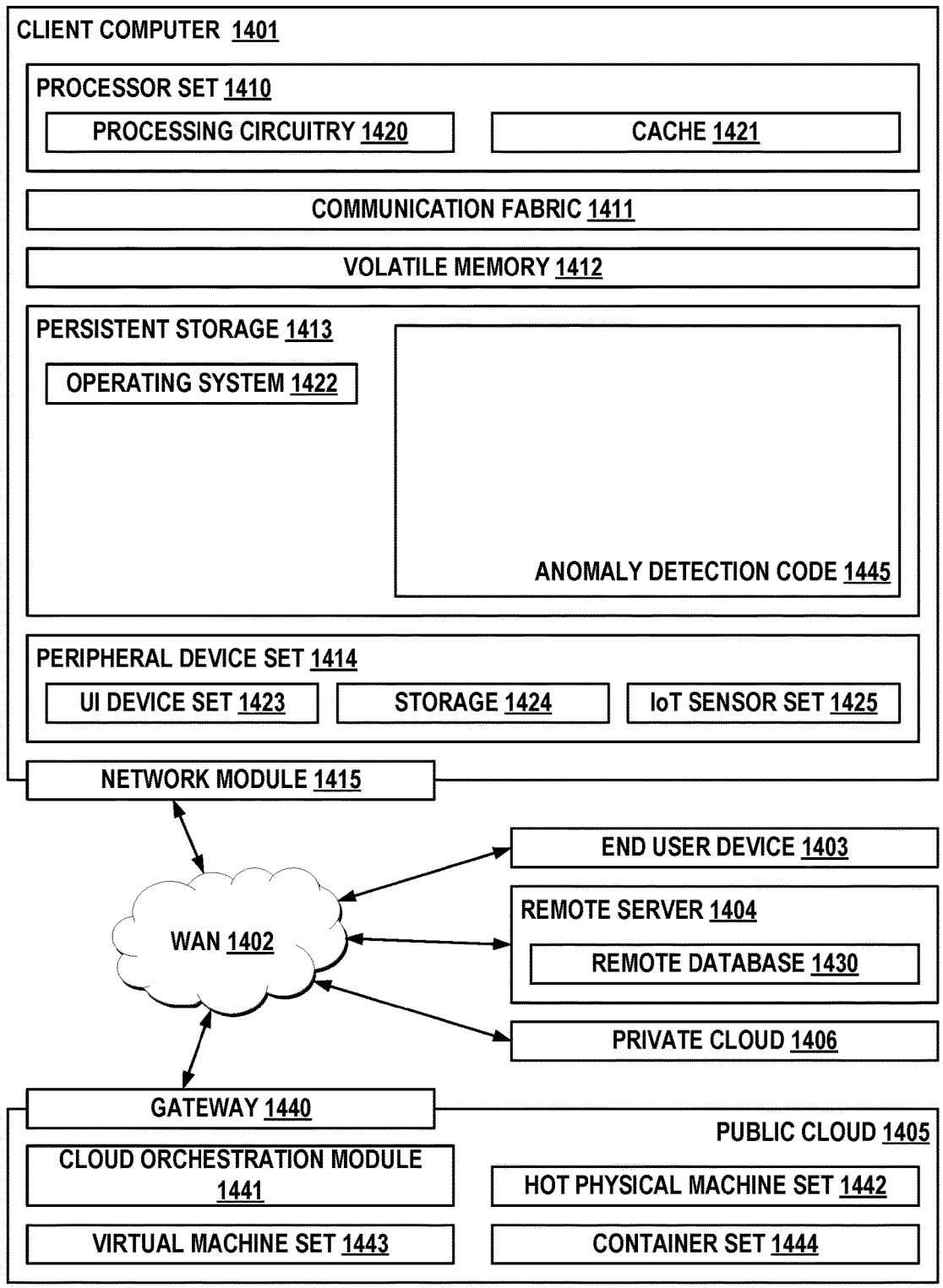
FIG. 14 illustrates a block diagram of an example, computing environment in which one or more embodiments described herein can be facilitated.

Turning next to FIG. 14, a detailed description is provided of additional context for the one or more embodiments described herein at FIGS. 1-13.

FIG. 14 and the following discussion are intended to provide a brief, general description of a suitable computing environment 1400 in which one or more embodiments described herein at FIGS. 1-13 can be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1400 contains an example of an environment for the execution of at least some of the computer code involved in performing the inventive methods, such as anomaly detection code 1445. In addition to block 1445, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 1445, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

COMPUTER 1401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method may be distributed among multiple computers and/or between multiple locations. On the other hand, in this presentation of computing environment 1400, detailed discussion is focused on a single computer, specifically computer 1401, to keep the presentation as simple as possible. Computer 1401 may be located in a cloud, even though it is not shown in a cloud in FIG. 1. On the other hand, computer 1401 is not required to be in a cloud except to any extent as may be affirmatively indicated.

PROCESSOR SET 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip." In some computing environments, processor set 1410 may be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods may be stored in block 1445 in persistent storage 1413.

COMMUNICATION FABRIC 1411 is the signal conduction paths that allow the various components of computer 1401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory may be distributed over multiple packages and/or located externally with respect to computer 1401.

PERSISTENT STORAGE 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid state storage devices. Operating system 1422 may take several forms, such as various known proprietary operating systems or open source Portable Operating System Interface type operating systems that employ a kernel. The code included in block 1445 typically includes at least some of the computer code involved in performing the inventive methods.

PERIPHERAL DEVICE SET 1414 includes the set of peripheral devices of computer 1401. Data communication connections between the peripheral devices and the other components of computer 1401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 1401 is required to have a large amount of storage (for example, where computer 1401 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

NETWORK MODULE 1415 is the collection of computer software, hardware, and firmware that allows computer 1401 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1403 is any computer system that is used and controlled by an end user (for example, a customer of an enterprise that operates computer 1401), and may take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

REMOTE SERVER 1404 is any computer system that serves at least some data and/or functionality to computer 1401. Remote server 1404 may be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data may be provided to computer 1401 from remote database 1430 of remote server 1404.

PUBLIC CLOUD 1405 is any computer system available for use by multiple entities that provides on-demand availability of computer system resources and/or other computer capabilities, especially data storage (cloud storage) and computing power, without direct active management by the scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
an extraction component that extracts multiple layers of features from one or more patches of an image using a pretrained convolutional neural network (CNN);
a feature mapping component that concatenates the features from the multiple layers to generate a tensor feature map comprising a one-dimensional feature vector for respective patches;
a cropping component that performs center cropping on the tensor feature map; and
a calculation component that calculates a distance to a feature distribution mean for respective patches.

2. The system of claim 1, the computer executable components further comprising a scoring component that calculates an image anomaly score based on the distance.

3. The system of claim 1, the computer executable components further comprising a resizing component that resizes the features to a same size.

4. The system of claim 3 wherein the resizing component resizes the features to the same size employing interpolation.

5. The computer-implemented method of claim 4, further comprising resizing all the features to the same size.

6. The system of claim 5, wherein resizing all features to the same size is by interpolation.

7. The system of claim 1, wherein the calculation component calculates the distance by:
estimating parameters of a multivariate Gaussian distribution on one-dimensional feature vectors of respective patches; and
calculating a distance between the one-dimensional feature vectors of the patch and a mean of the multivariate Gaussian distribution for respective patches.

8. The system of claim 7, wherein the scoring component calculates the image anomaly score by averaging a maximum percentage of distances associated with different patches.

9. The system of claim 1, wherein a patch of the image corresponds to a center of the image.

10. The system of claim 1, wherein the extraction component can extract multiple features from multiple patches of the same image to facilitate the generation of an anomaly map.

11. A computer implemented method, comprising:
extracting multiple layers of features from one or more patches of an image using a pretrained convolutional neural network (CNN);
concatenating the features from the multiple layers to generate a tensor feature map comprising a one-dimensional feature vector for respective patches;
performing center cropping on the tensor feature map;
calculating a distance to a feature distribution mean for respective patches; and
calculating an image anomaly score based on the distance.

12. The method of claim 11, further comprising:
estimating parameters of a multivariate Gaussian distribution on one-dimensional feature vectors of respective patches; and
calculating a distance between the one-dimensional feature vectors of respective patches and the mean of the multivariate Gaussian distribution for respective patches.

13. The method of claim 12, wherein calculating the image anomaly score comprises averaging a maximum percentage of distances associated with different patches.

14. The method of claim 11, wherein a patch of the image corresponds to the center of the image.

15. The method of claim 11, further comprising:
extracting multiple features from multiple patches of the same image to facilitate the generation of an anomaly map.

16. A computer program product facilitating anomaly detection in images, the computer program product comprising a non-transitory computer readable storage medium having program instructions embodied therewith, the program instructions executable by a processor to cause the processor to:
extract multiple layers of features from one or more patches of an image using a pretrained convolutional neural network (CNN);
concatenate the features from the multiple layers to generate a tensor feature map comprising a one-dimensional feature vector for respective patches;
perform center cropping on the tensor feature map;
calculate a distance to a feature distribution mean for respective patches; and
calculate an image anomaly score based on the distance.

17. The computer program product of claim 16, wherein the program instructions are further executable by the processor to cause the processor to resize all the features to the same size.

18. The computer program product of claim 16, wherein the program instructions are further executable by the processor to cause the processor to:
estimate parameters of a multivariate Gaussian distribution on one-dimensional feature vectors of respective patches; and
calculate a distance between the one-dimensional feature vectors of respective patches and the mean of the multivariate Gaussian distribution for respective patches.

19. The computer program product of claim 18, wherein calculating the image anomaly score comprises averaging a maximum percentage of distances associated with different patches.

20. The computer product of claim 16, wherein a patch of the image corresponds to the center of the image.

* * * * *